April 9, 1968

B. F. LATHAM, JR 3,377,137

PRODUCTION OF CARBON BLACK AND CHLORINATED HYDROCARBONS

Filed Nov. 7, 1963

INVENTOR.
BURTON F. LATHAM JR.
BY
William A. Mikesell Jr.
ATTORNEY

INVENTOR.
BURTON F. LATHAM JR.

April 9, 1968 B. F. LATHAM, JR 3,377,137
PRODUCTION OF CARBON BLACK AND CHLORINATED HYDROCARBONS
Filed Nov. 7, 1963 3 Sheets-Sheet 3

INVENTOR.
BURTON F. LATHAM JR.
BY William A Mikesell
ATTORNEY

United States Patent Office 3,377,137
Patented Apr. 9, 1968

3,377,137
PRODUCTION OF CARBON BLACK AND
CHLORINATED HYDROCARBONS
Burton F. Latham, Jr., Houston, Tex., assignor to Continental Carbon Company, Houston, Tex., a corporation of Delaware
Filed Nov. 7, 1963, Ser. No. 322,212
12 Claims. (Cl. 23—209.1)

ABSTRACT OF THE DISCLOSURE

Hydrocarbons are reacted with chlorine in a manner such that the reactants are initially separated by an inert gas barrier; products comprise hydrogen chloride and, depending upon reaction temperature, varying proportions of carbon black and chlorinated hydrocarbons. In one embodiment, the hydrogen chloride is regenerated to recover chlorine for recycle.

This invention relates to pyrolysis of hydrocarbons using chlorine as an oxidant. In one of its aspects, the invention relates to process and apparatus for production of carbon black by combustion of a hydrocarbon with chlorine in a hydrogen chloride atmosphere. In another aspect, the invention relates to process and apparatus for oxidation of a hydrocarbon with chlorine, neutralization with a base of the hydrogen chloride thus produced, and recovery by electrolysis of chlorine from the resulting salt for re-use in the process. In still another aspect, the invention relates to process and apparatus for producing chloroparaffins and other chlorinated hydrocarbons and carbon black by pyrolysis of hydrocarbons with chlorine in a hydrogen chloride atmosphere. In yet another aspect, the invention relates to process and apparatus for oxidation of a hydrocarbon with chlorine, and oxidation of the resulting hydrogen chloride to recover chlorine for recycle to oxidation.

Although oxidation of various organic compounds, such as natural gas, methane, and methylene chloride, with chlorine has been proposed, there has been little or no commercial use of this process. Carbon black is generally prepared by pyrolysis of a hydrocarbon using oxygen as the oxidizing agent; thus, one reason for lack of commercial acceptance of chlorine as an oxidizing agent has been the cost of chlorine as compared to that of oxygen, for which air is generally used as the source.

Another reason that this process has not been commercialized is that the reactors used for this process in the past became quickly coked up during operation, allowing runs of only short duration.

Accordingly, it is an object of this invention to provide process and apparatus for chlorine oxidation of hydrocarbons wherein chlorine can be recovered for recycle to the oxidation. It is another object of this invention to provide process and apparatus for chlorine oxidation of hydrocarbons wherein build-up of coke within the reaction zone is minimized. It is still another object of this invention to provide process and apparatus in which chloroparaffins and/or carbon black can be produced in essentially quantitative yield.

Other aspects, objects, and the several advantages of this invention will become apparent upon study of this disclosure, the appended claims, and the drawing, in which:

According to the invention, there are provided process and apparatus for producing carbon black wherein a hydrocarbon stream and a stream of chlorine are introduced into a reaction zone in a manner as to prevent contact with each other during their initial introduction into the reaction zone by initially separating them with a stream of inert gas. In one embodiment, the walls of the reaction zone are gas-permeable and are also swept by an inert gas. In another embodiment, chlorine used for oxidizing the hydrocarbon to carbon black is recovered for recycle from the resulting hydrogn chloride, as by oxidation of the hydrogen chloride to chlorine or by reaction of the hydrogen chloride with a base, and electrolysis of the resulting brine, to liberate chlorine.

Figure 1:
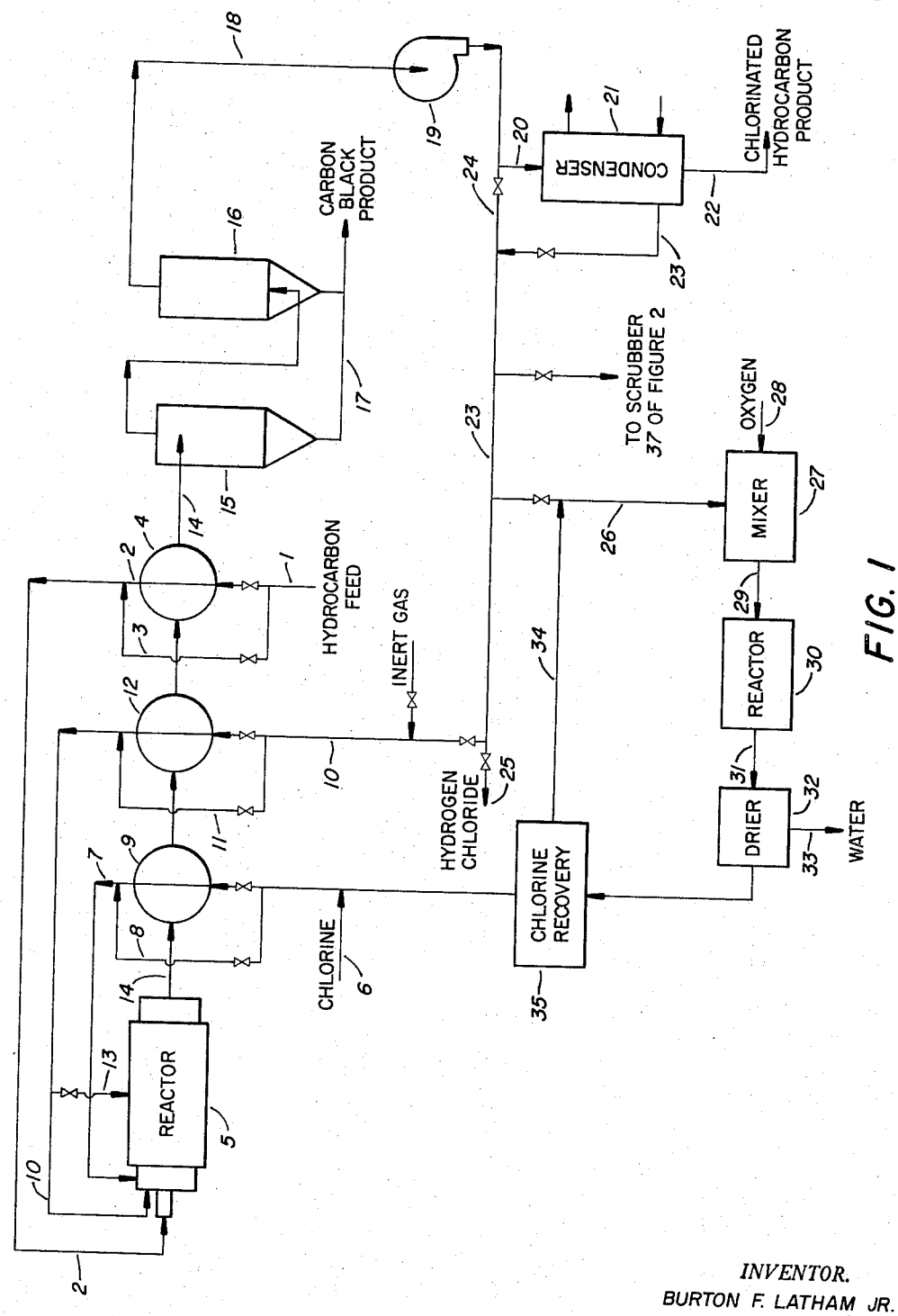
FIGURE 1 is a schematic flow diagram of one embodiment of the invention.

A more complete understanding of the invention will be gained by reference to the drawings. Referring first to FIGURE 1, a hydrocarbon feedstream 1 is passed by way of conduit 2 and by-pass conduit 3 through and around heat exchanger 4 and thence to a reactor 5. Chlorine is introduced to the system by way of conduit 6, and passes by way of conduit 7 and by-pass 8 through and around heat exchanger 9 and thence into reactor 5. Hydrogen chloride or other gas inert to the reaction passes by way of conduit 10 and by-pass 11 through and around heat-exchanger 12 and thence to reactor 5. The inert gas is used, as can be seen by reference to FIGURE 3, to separate the chlorine and hydrocarbon ractants upon their initial entry into the reactor, thereby preventing build-up of coke on the entry nozzle. Some inert gas can also be passed by way of conduit 13 through the gas-permeable liner of the reactor in order to prevent coke build-up on the reactor walls. The hydrocarbon is oxidized by chlorine in reactor 5, producing carbon black, hydrogen chloride, and also chlorinated paraffins and other chlorinated hydrocarbons if desired. The reactor effluent, comprising a gaseous suspension of carbon black, passes by way of conduit 14 through heat exchangers 9, 12 and 4 where it pre-heats the reactor feedstreams as previously described. The by-passes 3, 8, and 11 can be controlled, for instance, responsive to the temperature downstream of the heat exchangers of either the reactor feedstreams or the reactor effluent. The cooled reactor effluent is then treated for product carbon black recovery. In the embodiment of FIGURE 1, this comprises gas-solids cyclone 15 and bag filter 16. Carbon black is removed from cyclone 15 and filter 16 by way of conduit 17, while the remaining gases are withdrawn by way of conduit 18 and induced draft blower 19. When chlorinated paraffins are desired as a product, the gases are then passed by way of conduit 20 to condenser 21 whereto they are cooled sufficient to liquefy the chlorinated products, which are removed by way of conduit 22. The remaining gases, comprising hydrogen chloride, are passed by way of conduit 23 for recycle by way of conduit 10. If chlorinated hydrocarbons are not desired as a product, condenser 21 can be by-passed by use of conduit 24. Excess hydrogen chloride can be removed as product by way of conduit 25.

According to one embodiment of the invention, the chlorine value of hydrogen chloride, such as in stream 23, can be recovered for recycle to hydrocarbon oxidation by oxidizing the hydrogen chloride with a free-oxygen containing gas. e.g. air. This is illustrated by passing hydrogen chloride by way of conduit 26 to mixer 27, wherein it is mixed with an oxygen-containing gas introduced by way of conduit 28. The mixed gas stream passes by way of conduit 29 to reactor 30, wherein it is contacted with e.g. a chromic oxide catalyst to promote the reaction $$4HCl + O_2 \rightarrow 2Cl_2 + 2H_2O$$

This reaction is further described in U.S. Patent 2,678,-259, issued May 11, 1954, to Robert G. Banner et al. Oxidized product passes by way of conduit 31 to drier 32, wherein water is removed by way of conduit 33. The remaining gas comprises chlorine, oxygen, and unreacted hydrogen chloride, and passes via conduit 34 to chlorine recovery unit 35, which can comprise for example an absorbent-stripper combination using a chloroform-carbon tetrachloride absorbent fluid. The recovered chlorine can then be recycled via conduit 7 for use in oxidizing hydrocarbon feed, while the remaining mixture of hydrogen chloride and oxygen are returned to mixer 27 via conduit 34 for further reaction. When using the described absorber-stripper system, some hydrogen chloride enters the absorbent along with the chlorine and is stripped off with it, thus being returned to reactor 5 by way of conduit 7. This hydrogen chloride serves to dilute the reaction mixture and thus hold down the reaction temperature, which would otherwise require an excess of hydrocarbon feed to the reactor 5; excess hydrocarbon would produce hydrogen which would in turn present an explosion hazard in mixer 27. It is also preferred to dry all reactor feedstreams, as in conduits 2, 7, and 10, in order to minimize corrosion and eliminate the water gas reaction, $$C + H_2O \rightarrow CO + H_2$$

Figure 2:
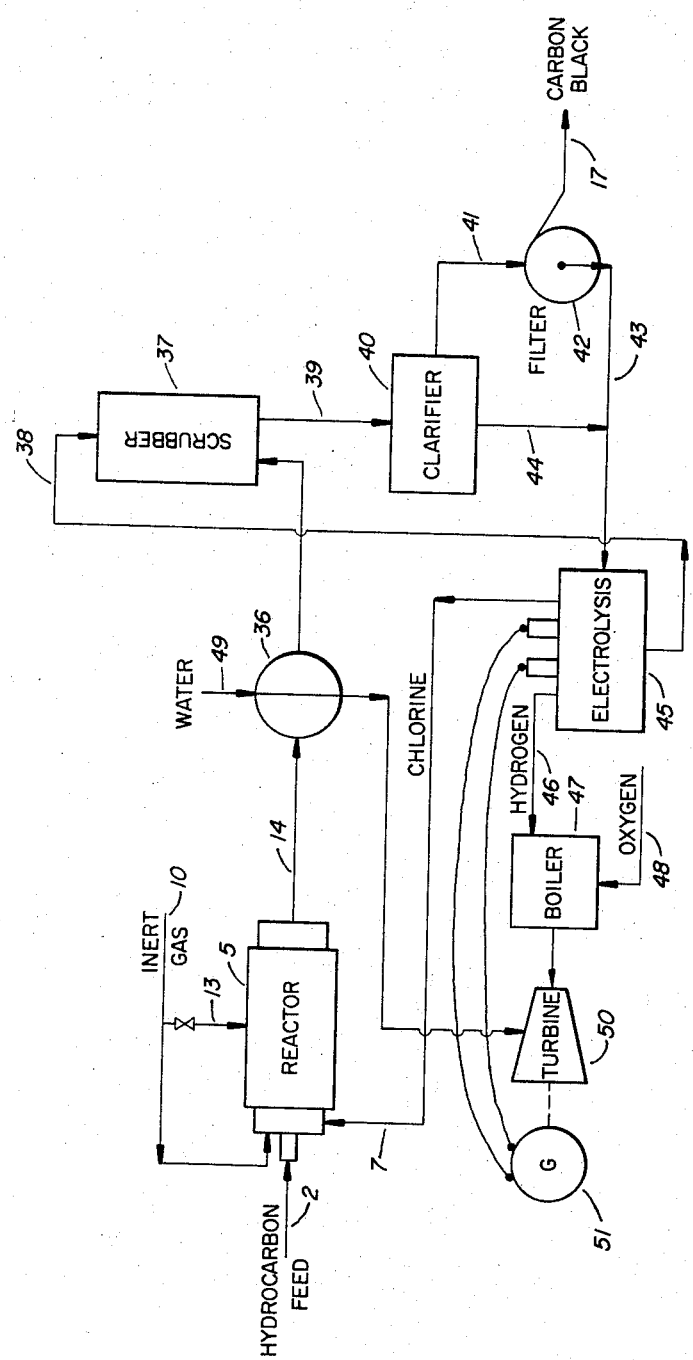
FIGURE 2 is a schematic flow diagram of a second embodiment of the invention.

Alternatively to the above-described oxygen oxidation recovery of chlorine, this filtered stream 23 can be passed to scrubber 37 of FIGURE 2.

Referring now to the embodiment shown in FIGURE 2, there is provided a second method for regenerating chlorine used in the hydrocarbon oxidation. Like numerals are used in this figure where there is correspondence with FIGURE 1. Thus, a hydrocarbon feed is passed by way of conduit 2 to reactor 5; this feedstream can be preheated by exchange with e.g. effluent stream 14, if desired, in an exchanger not shown. An inert gas is passed to reactor 5 by way of conduit 10 and, if desired, also by way of conduit 13. Chlorine as oxidizing agent is introduced into the reactor by way of conduit 7. Streams 10 and 7 can also be preheated. Reactor effluent in conduit 14 passes through exchanger 36 to a contacting apparatus such as scrubber 37. The reactor effluent, comprising a suspension of carbon black in hydrogen chloride, is contacted in scrubber 37 with an aqueous base solution, such as aqueous sodium hydroxide, introduced by way of conduit 38. The neutralization of the acid gas with the aqueous base results in foramtion of an aqueous suspension of carbon black in salt solution, which is passed by way of conduit 39 to clarifier 40. Carbon black is skimmed off clarifier 40 and passes via conduit 41 to filter 42, where it is washed and separated from remaining brine. The carbon black stream in conduit 17 can then be dried as product. Wash liquid via conduit 43 and underflow from clarifier 40 via conduit 44, both comprising aqueous salt solution, are passed to electrolysis cell 45. Within this cell, the salt soltuion is subjected to an electrical potential, which effects the reaction $$2NaCl + 2H_2O \rightarrow 2NaOH + H_2 + Cl_2$$

Thus, both chlorine and aqueous base are regenerated. The chlorine is returned for use as oxidant via conduit 7, and the aqueous base is returned for the contacting in scrubber 37 via conduit 38. Hydrogen gas is passed by way of conduit 46 to a boiler 47, where it is burned with oxygen, e.g. air, via conduit 48. The resulting steam, along with steam resulting from heating water via conduit 49 in exchanger 36, is used to power a turbine 50 which in turn drives a generator 51. Generator 51 supplies the potential necessary for operation of electrolysis cell 45. Again, as in FIGURE 1, it is preferred to dry reactant streams 2, 7, and 10 by driers not shown. As stated previously in conjunction with FIGURE 1, the carbon black in this system of FIGURE 2 can alternatively be removed by filtration of the reactor effluent gas, in which instance clarifier 40 and filter 42 are not required.

Figure 3:
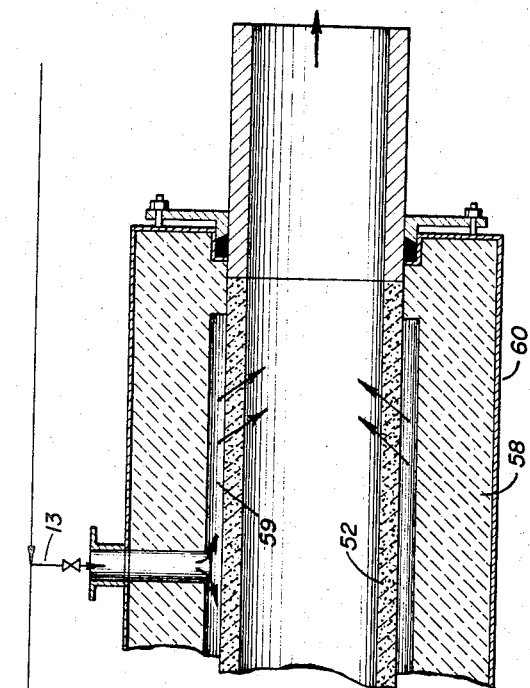
FIGURE 3 is a longitudinal section through a furnace apparatus of the invention.
Figure 3:
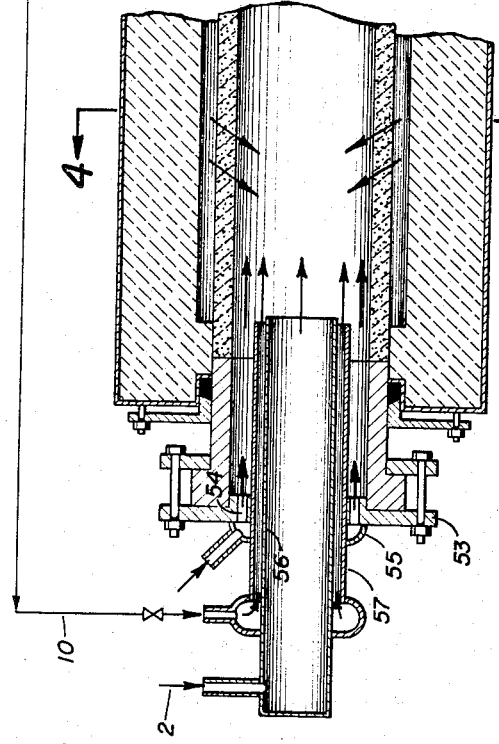
Figure 4:
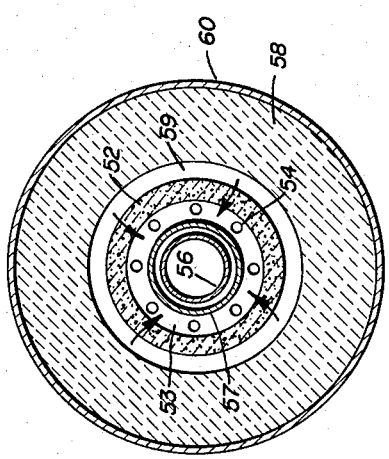
FIGURE 4 is a transverse section taken on FIGURE 3.

A preferred form of reactor 5 is shown in FIGURE 3. The reactor comprises a gas-permeable tube 52, such as a porous refractory. This tube is nonpermeable at its ends, and is provided at its upstream end with a closure flange 53. This flange 53 is provided with a number of holes 54 which, in cooperation with manifold 55, provide for inlet of chlorine reactant by way of conduit 7. Centrally disposed in flange 53 are concentric inlet pipes 56 and 57. Pipe 56 provides for introduction of hydrocarbon by way of conduit 2, and the annulus between pipes 56 and 57 provides for introduction of an inert gas, such as hydrogen chloride, by way of conduit 10. This nozzle arrangement has been found to eliminate troublesome coke build-up on the face of the inlet nozzle by keeping the reactants, hydrocarbon and chlorine, separated until they are away from the nozzle face. The porous portion of tube 52 is surrounded by a refractory wall 58 designed to form an annular chamber 59. Wall 58 is supported by a suitable shell 60, which is preferably exteriorly insulated. Inert gas is passed by way of conduits 10 and 13 to annulus 59, and is forced through wall 52; this prevents coke build-up on the interior wall of the reactor. Reaction effluent, produced by chlorine oxidation of the hydrocarbon and comprising carbon black suspended in hydrogen chloride, passes out the end of the reactor to conduit 14. FIGURE 4 is a section taken through reactor 5. When gas is passed by way of conduit 13 through the porous wall, this preferably comprises about 90 percent of the total inert gas, i.e. about 10 percent of the inert gas is passed by way of conduit 10.

The reaction taking place in reactor 5 can be represented by the equation:

$$C_xH_y + \frac{y}{2}Cl_2 \longrightarrow xC + yHCl$$

wherein $x$ and $y$ can vary over a wide ratio, depending on the hydrocarbon feedstock employed. It is this reaction which dominates over the temperature range of about 2000 to about 3000° F. If chlorinated hydrocarbons are desired as a product, a lower temperature range of about 250 to about 1250° F. is selected, where the dominant reaction is:

$$C_xH_y + \frac{2x+y+2}{2}Cl_2 \longrightarrow yHCl + C_xCl_{(2x+2)}$$

Of course, temperature conditions and ratio of chlorine to hydrocarbon can be varied to vary both the carbon chain size and the degree of chlorination of the product, although the equation has been written to show production of completely chlorine-substituted product. Between the temperatures of about 1250° F. and about 2000° F., a mixture of carbon black, chlorinated hydrocarbon, and hydrogen chloride is produced.

These preceding reactions normally result in substantial deposition of coke in the reactor, both on the reactant inlet nozzle and on the interior reactor wall. By the use of inert gas, as described, this coking is minimized or eliminated. Hydrogen chloride has been mentioned as a suitable inert gas; although it is generally not considered to be inert, it is non-reactive with the reactants and under the conditions involved here, which is what is meant here by the term inert. Other suitable gases include nitrogen, helium, argon, etc. The inert gas, chlorine, and hydrocarbon flows are preferably adjusted so that their velocities entering the reaction zone are all about equal, and also preferably within the laminar flow range. As a result of the separation of the reactants by the inert gas, reaction does not occur until the gases are some distance from the inlet nozzle, which reduces or eliminates coke build-up on the nozzle. As mentioned, the reactor walls are preferably gas-permeable and are also swept by inert gas, which can be the same or different gas as used in the nozzle assembly.

Reactor effluent, comprising carbon black, hydrogen chloride, and chlorinated hydrocarbons when desired, is used to preheat the reactants by indirect heat exchange as shown, which also serves to cool the reactant effluent sufficiently to be handled in the subsequent treatments. When chlorinated hydrocarbons are being produced according to the system of FIGURE 1, it is preferred that the vapor stream temperature passing through separators 15 and 16 be maintained between about 400 and about 650° F. in order to prevent premature condensation of chlorinated hydrocarbons. When operating according to the system of FIGURE 2, the reaction gases are preferably cooled to about 200° F. or lower prior to entry into scrubber 37.

The hydrogen chloride produced by the process can be used for selling as such or absorbed in water to be used as hydrochloric acid in addition to being used as the inert gas in the reactor and being treated for recovery of its chlorine content. Recovery of chlorine by electrolysis, as shown in FIGURE 2, can be effected by use of various bases for neutralization of the hydrogen chloride, although sodium or potassium hydroxides are preferred because of their cheapness and solubilities; electroylsis of the resulting salt solution in known manner recovers the chlorine and base for recycle as well as producing hydrogen for generation of electric power required for electrolysis.

Suitable hydrocarbon feedstocks include methane, natural gas, and various petroleum oils and coal tars. Liquid hydrocarbon feeds are vaporized or atomized for use in the reactor. Because the theoretical reaction temperature of the reaction $CH_4 + 2Cl_2 \rightarrow C + 4HCl$ is about 3540° F., an excess of one reactant over the other is preferably used to maintain the temperature within the desired range. When chlorinated hydrocarbons are not desired as a product, the hydrocarbon is used in excess so that the cracking of hydrocarbon, $CH_4 \rightarrow C + 2H_2$, absorbs a portion of the reaction heat.

The invention will be further illustrated by the following specific examples.

EXAMPLE 1

A reactor as shown in FIGURE 3 was used to produce carbon black by chlorine oxidation of natural gas. Gas jet 56 had an opening of 0.035 inch, and two chlorine jets 54 had openings of 0.058 and 0.051 inch respectively. Chlorine flow was 0.94 l./min., natural gas flow was 0.71 l./min., and the reactor furnace temperature was 2500° F. The photometer of the resulting carbon black was 86. During a run of 2½ hours, no coke build-up in the reactor was evident.

EXAMPLE 2

Natural gas was oxidized by chlorine using a reactor similar to that of Example 1. During this run, the reactor temperature was maintained at a maximum of about 1000° F. The flow rates of both chlorine and natural gas were varied during the run. Some carbon black was produced, but the product was primarily a large amount of mixed liquid chlorinated hydrocarbons.

EXAMPLE 3

Methane was oxidized with chlorine in a reactor similar to that of Example 1, using hydrogen chloride as the inert gas. Chlorine flow rate was 2 l./min. and HCl flow was 6 l./min. Methane was used sufficient to provide a slight excess of chlorine in the combustion product. The carbon black product had a photometer of 97, a chloride content of 4.26 wt. percent, an iodine absorption of 231 m.$^2$/g., and a tint based on HAF black of 100 was 114. Refluxing this black with benzene reduced chloride content to 1.98 wt. percent and iodine absorption to 124 m.$^2$/g., indicating a low content of chemically bonded chlorine. After a run of 80 minutes, the reactor was inspected and found to be clean, both as to the nozzle and as to the reactor walls.

EXAMPLE 4

A run similar to Example 3 was made, except that acetylene was used in place of methane, and nitrogen was used as the inert gas. The carbon black photometer was 66, the chloride content was 5.24 wt. percent, the iodine absorption was 238 m.$^2$/g., and tint compared to HAF black was 82.

EXAMPLE 5

A run was made similar to Example 4, except that lower flow rates were used. The carbon black photometer was 97, the chloride content was 5.24 wt. percent, iodine absorption was 255 m.$^2$/g., and tint compared to HAF black was 97.

EXAMPLE 6

A run was made oxidizing methane with chlorine. After about seven hours, the run was stopped and the reaction tube inspected. The tube, which was a porous alundum, was found to be badly eroded about 2″ downstream of the nozzle. The carbon black had a chloride content of 3.87 wt. percent.

EXAMPLE 7

The porous alundum tube of Example 6 was replaced by a porous graphite tube having a permeability of 1. Methane flow rate was 1.5 l./min., nitrogen flow rate (the inert gas) was 0.25 l./min., and chlorine flow rate was adjusted so as to be slightly in excess in the effluent. The carbon black product had a photometer of 100, an iodine absorption of 100 m.$^2$/g., a pH of 7.9, and a chloride content of 0.00 percent.

Having thus described the invention by providing specific examples thereof, it is to be understood that no undue limitations or restrictions are to be drawn by reason thereof, and that many variations and modifications are within the scope of the invention.

What is claimed is:

1. A process which comprises introducing a stream of combustible hydrocarbon into a reaction zone, passing a stream of chlorine into said reaction zone in a direction substantially parallel to and co-current with that of said hydrocarbon stream, passing a stream of gaseous hydrogen chloride into said reaction zone in a manner as to substantially peripherally surround the introduced stream of combustible hydrocarbon and prevent immediate contact between said hydrocarbon and chlorine streams, maintaining a temperature of at least about 250° F. in said reaction zone, removing from said reaction zone a stream comprising hydrogen chloride and at least one of the group consisting of carbon black and chlorinated hydrocarbon, separating from the thus-removed stream a product comprising at least one of carbon black and chlorinated hydrocarbon, also separating from the thus-removed stream gaseous hydrogen chloride, and returning a portion of this hydrogen chloride to said step of passing a stream of hydrogen chloride into said reaction zone.

2. The process of claim 1 wherein said reaction zone comprises a gas-permeable zone, and wherein there is introduced into said reaction zone through its gas-permeable boundary a stream of gaseous hydrogen chloride.

3. The process of claim 1 wherein the reaction temperature is at least about 1250° F. and the stream removed from the reaction zone comprises carbon black and hydrogen chloride and wherein said separating a product comprises contacting the removed stream comprising carbon black and hydrogen chloride with an aqueous base solution so as to form an aqueous suspension of carbon black in brine, separating said suspension into a stream comprising carbon black product and a stream comprising brine, electrolyzing said stream comprising brine to produce a stream comprising chlorine and a stream comprising aqueous base solution, returning at least a portion of said stream comprising chlorine to said reaction zone for said step of passing into said reaction zone, and returning at least a portion of said stream comprising aqueous base solution for said step of contacting.

4. The process of claim 1 wherein said separating a product comprises filtering carbon black from said stream comprising carbon black and hydrogen chloride, and wherein at least a portion of the thus-filtered stream is returned for said step of passing gaseous hydrogen chloride.

5. The process of claim 4 wherein another portion of the thus-filtered stream is contacted with an aqueous base solution so as to form an aqueous brine, said brine is subjected to electrolysis to produce a stream comprising chlorine and a stream comprising aqueous base solution, said stream comprising chlorine is returned for said step of passing a stream of chlorine, and said stream comprising aqueous base solution is returned for said contacting.

6. The process of claim 4 wherein another portion of the thus-filtered stream is mixed with oxygen, the resulting mixed stream is contacted with a chromic oxide catalyst at about 750° F. to oxidize hydrogen chloride to chlorine, and at least a portion of the resulting chlorine is returned for said step of passing a stream of chlorine into said reaction zone.

7. A process for producing chlorinated hydrocarbons and carbon black which comprises passing a combustible hydrocarbon stream into a reaction zone, passing a chlorine-containing stream into said reaction zone in a direction substantially parallel to and co-current with that of said hydrocarbon stream, passing a stream of inert gas comprising hydrogen chloride into said reaction zone between said hydrocarbon and said chlorine-containing streams so as to prevent immediate contact between said streams upon their introduction into said reaction zone, maintaining said reaction zone at a temperature of at least about 1250° F., removing from said reaction zone a stream comprising chlorinated hydrocarbons, hydrogen chloride, and carbon black, separating said removed stream into a stream comprising chlorinated hydrocarbon product, a stream comprising hydrogen chloride, and a stream comprising carbon black product, and returning a portion of said stream comprising hydrogen chloride to said step of passing an inert gas.

8. The process of claim 7 wherein said separating comprises cooling said removed stream to condense chlorinated hydrocarbon, removing chlorinated hydrocarbon as a product, recovering the remaining vapor stream comprising a suspension of carbon black in hydrogen chloride, and separating carbon black product therefrom.

9. The process of claim 8 wherein said separating carbon black product comprises contacting said remaining vapor stream with an aqueous base solution so as to form an aqueous suspension of carbon black in brine, separating said suspension into a stream comprising carbon black product and a stream comprising brine, electrolyzing said stream comprising brine to produce a stream comprising chlorine and a stream comprising aqueous base solution, returning at least a portion of said stream comprising chlorine to said reaction zone for said step of passing a chlorine-containing stream, and returning at least a portion of said stream comprising aqueous base solution for said step of contacting.

10. The process of claim 8 wherein said separating carbon black product comprises filtering said remaining vapor stream.

11. The process of claim 10 wherein a portion of the thus filtered vapor is mixed with oxygen, the resulting mixed stream is contacted with a chromic oxide catalyst at about 750° F. to oxidize hydrogen chloride to chlorine, and at least a portion of the resulting chlorine is returned for said step of passing a chlorine-containing stream into said reaction zone.

12. Reactor means for chlorine oxidation of hydrocarbons comprising elongated vessel means, nozzle means in one end of and substantially axially aligned with said vessel means and adapted to pass a hydrocarbon stream into said vessel means, inlet means in said one end adapted to pass a chlorine stream into said vessel means in a direction substantially parallel to said nozzle means, gas passage means between said nozzle means and said inlet means and adapted to pass inert gas into said reactor means in a direction substantially parallel to said nozzle means, exit means in another end of said vessel means, a gas-permeable liner in said vessel means, means for passing an inert gas through said liner into said vessel means, and separation means connected to said exit means adapted to separate a finely divided solid carbon product from a vapor.

References Cited
UNITED STATES PATENTS

| | | | |
|---|---|---|---|
| 1,498,924 | 6/1924 | McGuire | 23—209.1 |
| 2,064,413 | 12/1936 | Clark | 260—662 |
| 2,678,259 | 5/1954 | Banner et al. | 23—219 |
| 2,695,837 | 11/1954 | Benz | 23—209.6 X |
| 2,865,717 | 12/1958 | Krejci | 23—209.4 |
| 2,917,370 | 12/1959 | Edminster et al. | 23—259.5 |
| 3,005,688 | 10/1961 | Williams | 23—259.5 |
| 3,267,012 | 8/1966 | Schick | 204—128 |

EDWARD J. MEROS, *Primary Examiner.*